(12) United States Patent
Ruppert et al.

(10) Patent No.: US 9,694,669 B2
(45) Date of Patent: Jul. 4, 2017

(54) ACTIVE GRILLE MULTI PART MODULAR FRAME

(71) Applicant: Magna International, Inc., Aurora (CA)

(72) Inventors: Benjamin R. Ruppert, Chesterfield, MI (US); Martin R. Matthews, Troy, MI (US); Jeffrey B. Manhire, Rochester, MI (US); Anthony J. Povinelli, Romeo, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 15/136,180

(22) Filed: Apr. 22, 2016

(65) Prior Publication Data

US 2016/0236563 A1    Aug. 18, 2016

Related U.S. Application Data

(63) Continuation-in-part of application No. 14/422,923, filed as application No. PCT/US2013/057572 on Aug. 30, 2013, now Pat. No. 9,333,850.

(60) Provisional application No. 61/695,489, filed on Aug. 31, 2012.

(51) Int. Cl.
   *B60K 11/08*   (2006.01)
   *B60R 19/52*   (2006.01)

(52) U.S. Cl.
   CPC ............ *B60K 11/085* (2013.01); *B60R 19/52* (2013.01); *B60R 2019/525* (2013.01)

(58) Field of Classification Search
   CPC ....... B60K 11/08; B60K 11/085; B60R 19/52; B60R 2019/525

USPC .................... 180/68.1, 68.2, 68.3, 68.4, 68.6
   See application file for complete search history.

(56) References Cited

U.S. PATENT DOCUMENTS

| 2,551,921 A | * | 5/1951 | Arsem | ...................... F01P 7/12 |
| | | | | 123/41.04 |
| 4,753,288 A | | 6/1988 | Harvey | |
| 6,145,251 A | * | 11/2000 | Ricci | ....................... E06B 7/096 |
| | | | | 49/74.1 |

(Continued)

FOREIGN PATENT DOCUMENTS

| DE | 102009058760 A1 | 6/2011 |
| DE | 102011119368 A1 | 5/2012 |

OTHER PUBLICATIONS

International Search Report and Written Opinion for International Application No. PCT/US2013/057572 Filed on Aug. 30, 2013.

*Primary Examiner* — John Walters

(74) *Attorney, Agent, or Firm* — Warn Partners, P.C.

(57) ABSTRACT

An active grille shutter arrangement having a modular frame. The active grille shutter arrangement includes a primary frame piece defining a width and height of an aperture of the modular frame, wherein in the primary frame piece has a motor housing, and upper frame portion having a first end and a second end, a lower frame portion having a first end and a second end and the motor housing extends between the upper frame portion and the lower frame portion. There is a plurality of secondary frame pieces. The modular frame of the active grille shutter arrangement is formed by the connection of the primary frame piece in the secondary frame piece, wherein the modular frame defines the aperture.

28 Claims, 13 Drawing Sheets

(56) References Cited

U.S. PATENT DOCUMENTS

| | | | | |
|---|---|---|---|---|
| 8,161,919 B2* | 4/2012 | Klotz | ............... | B60K 11/085 |
| | | | | 123/41.04 |
| 8,646,552 B2* | 2/2014 | Evans | ............... | B60K 11/085 |
| | | | | 180/68.1 |
| 8,708,077 B2* | 4/2014 | Hori | ............... | B60K 11/085 |
| | | | | 180/68.1 |
| 8,794,362 B2* | 8/2014 | Lee | ............... | B60K 11/085 |
| | | | | 180/68.1 |
| 2011/0070817 A1 | 3/2011 | Walters | | |

* cited by examiner

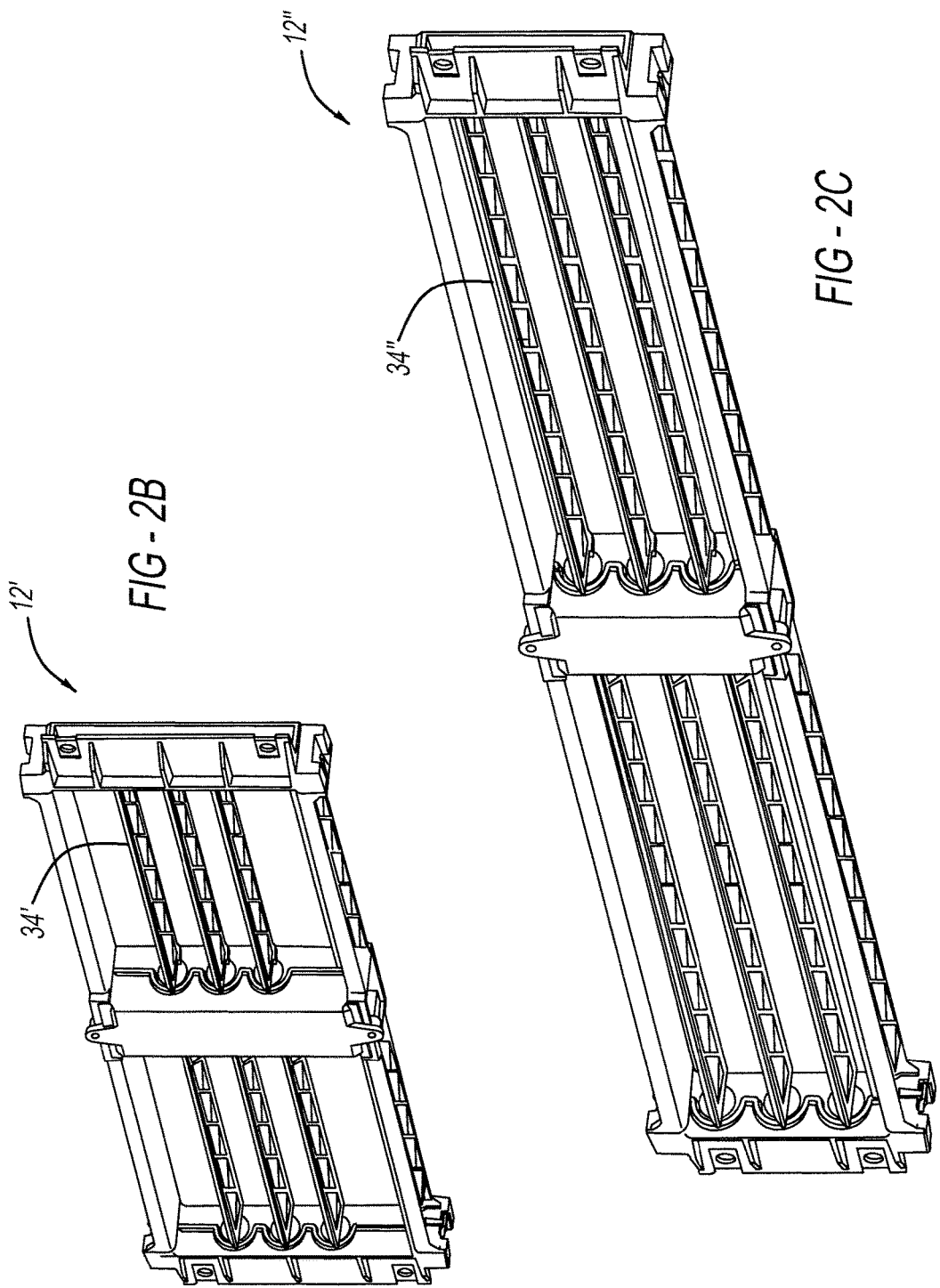

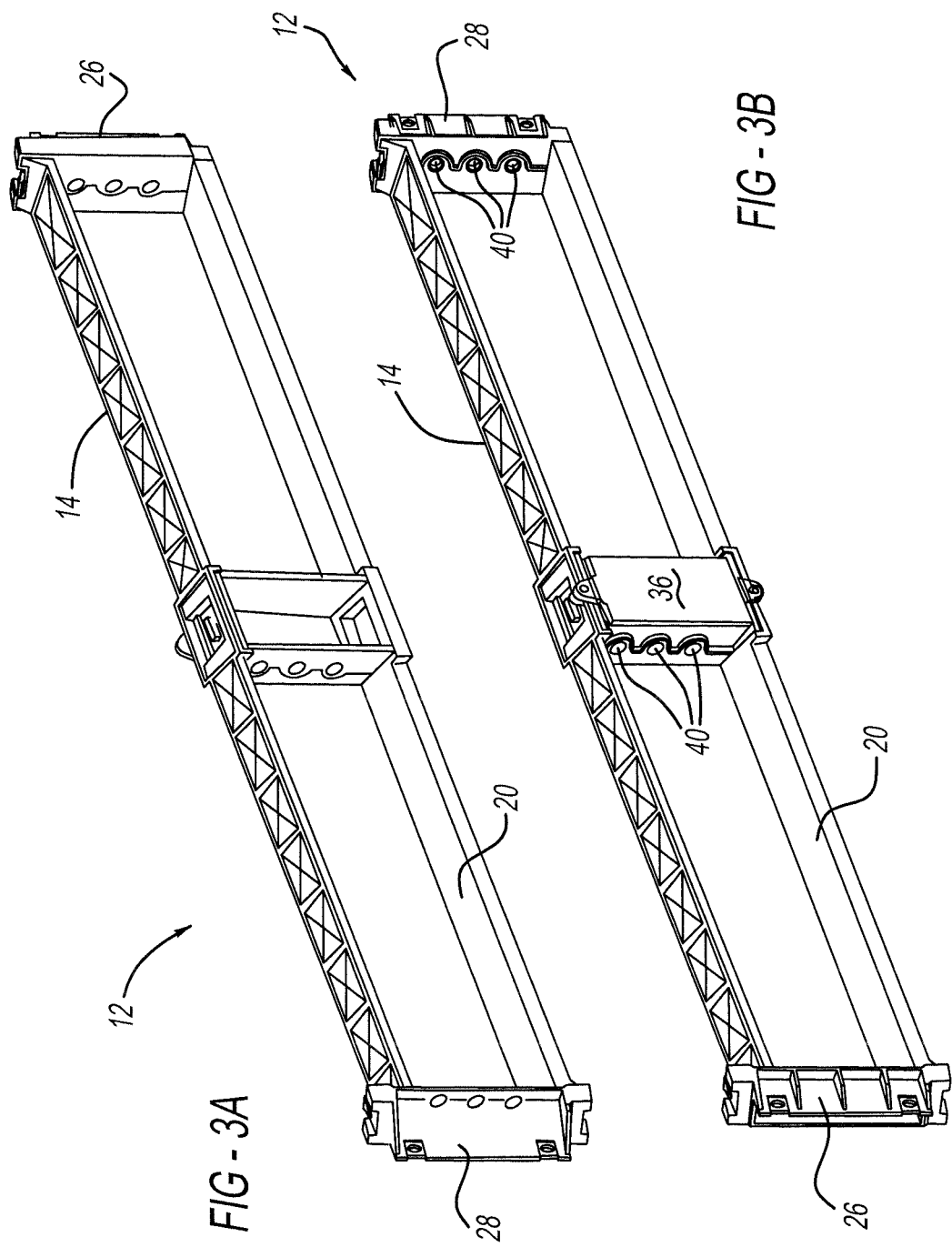

ACTIVE GRILLE MULTI PART MODULAR FRAME

CROSS-REFERENCE TO RELATED APPLICATIONS

This application is a Continuation-in-Part of U.S. patent application Ser. No. 14/422,923, Filed Feb. 20, 2015 which is a 371 of International Application No. PCT/US2013/057572, Filed on Aug. 20, 2013 which claims the benefit of U.S. Provisional Application No. 61/695,489, Filed on Aug. 31, 2012.

FIELD OF THE INVENTION

The present invention relates to a multi piece modular frame for use in an active grille shutter system for a vehicle.

BACKGROUND OF THE INVENTION

Various attempts have been made to optimize the cooling of various automobile parts. Some of the various devices developed have been designed to control the air flow throughout the engine compartment of the automobile such that the desired amount of heat is transferred away from the engine, transmission, and other components which generate heat, in order to maintain an optimal operating temperature.

However, it is also desirable to bring the engine up to the normal operating temperature as soon as possible after engine start-up. When the engine is substantially the same temperature as the surrounding environment and is turned on, the engine is the least fuel efficient (especially during start-up and the temperature of the surrounding environment is cold). The reduced fuel efficiency is why it is considered desirable to bring the engine up to the optimal operating temperature very quickly. Under these conditions, it is not desirable to remove heat away from the engine and the various components surrounding the engine, and therefore devices designed to control air flow around the engine are more beneficially used if they do not remove heat away from the engine at start-up.

Active grille systems that have been developed implement a frame is typically molded as a complete part. During assembly, the frame and/or the vanes have to be distorted in order to assemble the complete system onto the one piece frame. Additionally, the one piece frame has a low shipping density as it is mostly empty space. Furthermore, if an active grille system has two variants with either additional vanes or a base air flow, a complete new frame must be molded and shipped. It is therefore desirable to provide a frame that is multiple separate molded parts instead of one complete molding. This will aid in the assembly of the active grille shutter system without having to distort the frames or the vanes. Additionally, having multiple components accommodates the various variants that can be needed depending on the particular application. Lastly, having a multi-piece frame increases the shipping density since the various components can be stacked more closely together.

SUMMARY OF THE INVENTION

The present invention is directed to an active grille shutter arrangement having a modular frame. The active grille shutter arrangement includes a primary frame piece defining a width and height of an aperture of the modular frame, wherein in the primary frame piece has a motor housing, and upper frame portion having a first end and a second end, a lower frame portion having a first end and a second end and the motor housing extends between the upper frame portion and the lower frame portion. There is a plurality of secondary frame pieces including a first end cap, connectable to the first respective end of the upper frame portion and the first end of the lower frame portion by an upper bar and joint formed on the first end of the upper frame portion and a lower bar and joint formed on the first end of the lower frame portion. A second end of the plurality of secondary frame pieces is connectable to both the second end of the upper frame portion and the second end of the lower frame portion by an upper bar and joint formed on the second end of the upper frame portion and a lower bar and joint formed on the second end of the lower frame portion. The modular frame of the active grille shutter arrangement is formed by the connection of the primary frame piece in the secondary frame piece, where in the modular frame defines the aperture. The active grille shutter arrangement further includes a plurality of vanes rotatably positioned between the first end cap and the second end cap for controlling the amount of air flowing through the one or more apertures of the modular frame. The motor housing of the frame piece extends between the upper frame portion and the lower frame portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2B is an angled perspective view of the active grille arrangement in accordance with another aspect of the present invention;

FIG. 2C is an angled perspective view of the active grille arrangement in accordance with another aspect of the present invention;

FIG. 3A is a front angled perspective view of the active grille arrangement in accordance with the present invention;

FIG. 3B is a rear angled perspective view of the active grille arrangement in accordance with the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 4:
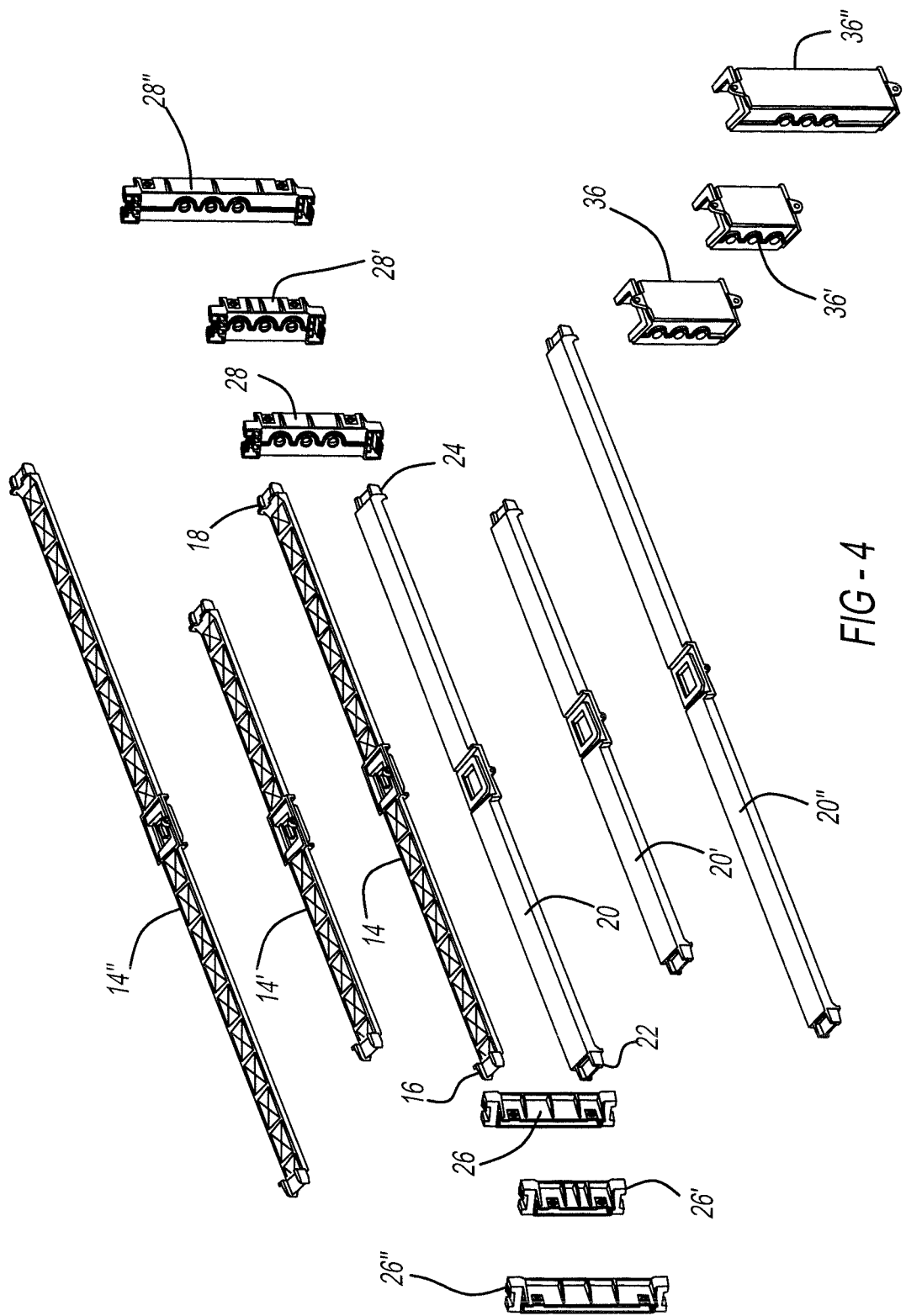
FIG. 4 is an exploded rear perspective view of the modular frame in accordance with an alternate embodiment of the present invention.

Referring now to the figures generally and with reference to FIGS. 1-8D, an active grille shutter arrangement 10 having an modular frame 12, 112, 212, 412, 512, 612 is depicted. The active grille shutter arrangement is defined herein to be an modular frame 12, 112, 212, 412, 512, 612, in accordance with one of the embodiments below, along with a motor assembly and vane as described below. Modular frame 12, 112, 212, 412, 512, 612, which is shown in various views as being exploded, disassembled and assembled in other views. Referring to FIG. 4 an exploded view of the modular frame in accordance with one embodiment of the invention is shown. The modular frame includes an upper frame portion 14 having a first end 16 and second end 18, as well as a lower frame portion 20 having a first end 22 and second end 24; a first end cap 26 and second end cap 28. The first end cap 26 and second end cap 28 are connected to the upper frame portion 14 and lower frame portion 20 to form the modular frame 12. As shown in the drawings, the shape of the modular frame 12 is generally rectangular; however, it is possible for the structure to have different shapes depending upon the particular application. The upper frame portion 14, lower frame portion 20, first end cap 26 and second end cap 28 are all formed of polymeric material and in a preferred embodiment of the invention are created using injection molding. In order to strengthen these components, structural ribs 30 are present on the components in order to make them stronger and reduce the amount of polymeric material needed to create the specific component.

When the upper frame portion 14, lower frame 20, first end cap 26 and second end cap 28 are assembled together to form the modular frame 12, one or more apertures, which in the present embodiment of the invention is a first aperture 32 and second aperture 32' created to allow air to pass through the modular frame 12 when assembled to a vehicle. The active grille shutter arrangement 10 is created when the assemble modular frame 12 has a plurality of vanes 34 connected between the first end cap 26 and second end cap 28, which can be rotated in order to control the amount of air flowing through the apertures 32. As shown in the present invention, the vanes 34 are connected between a motor housing or motor housing 36 extends between the upper frame portion 14 and the lower frame portion 20. The vanes 34 are connected between the motor housing 36 and one of the first end caps 26 or second end cap 28 and are configured to rotate about barrels 38 formed on each end of the plurality of vanes 34, such that the barrels 38 are rotatably disposed in holes 40 on the motor housing 36, first end cap 26 or second end cap 28. Inside of the motor housing 36 is a motor or actuator 42 that controls the rotatable position of the vanes 34 and thereby controls the amount of air flowing through the apertures 32.

Figure 8A:
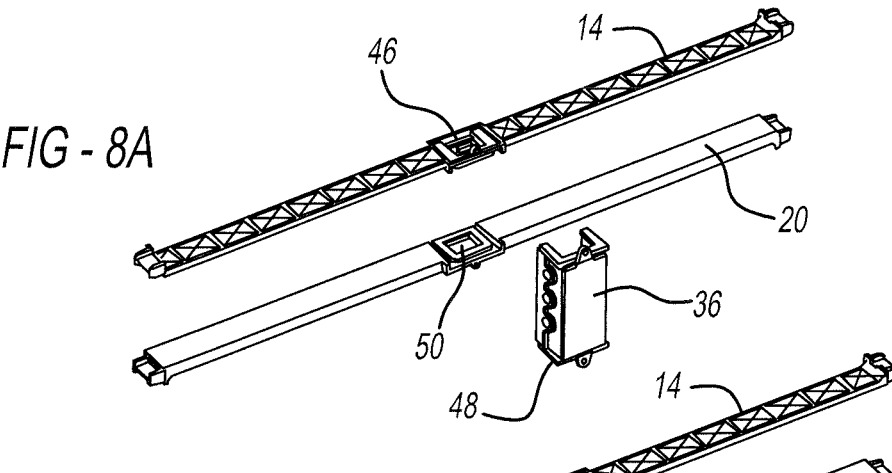
FIG. 8A is a perspective view showing the assembly of the modular frame.
Figure 8B:
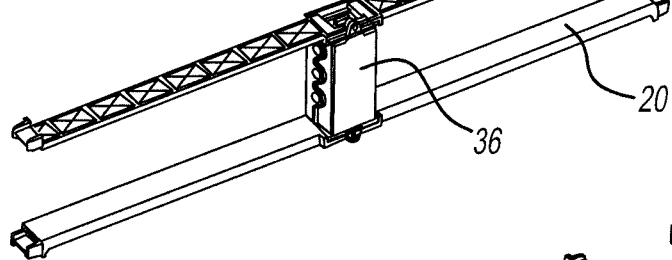
FIG. 8B is a perspective view showing the assembly of the modular frame.
Figure 8C:
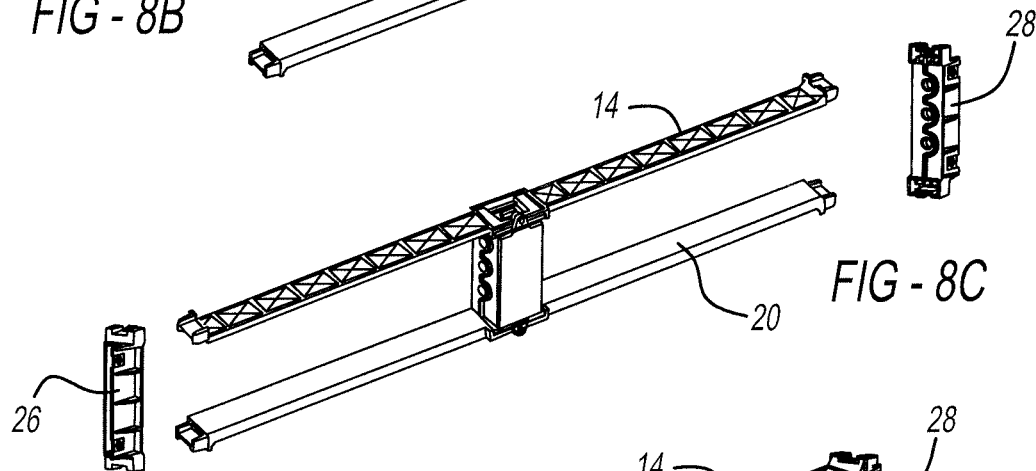
FIG. 8C is a perspective view showing the assembly of the modular frame.
Figure 8D:
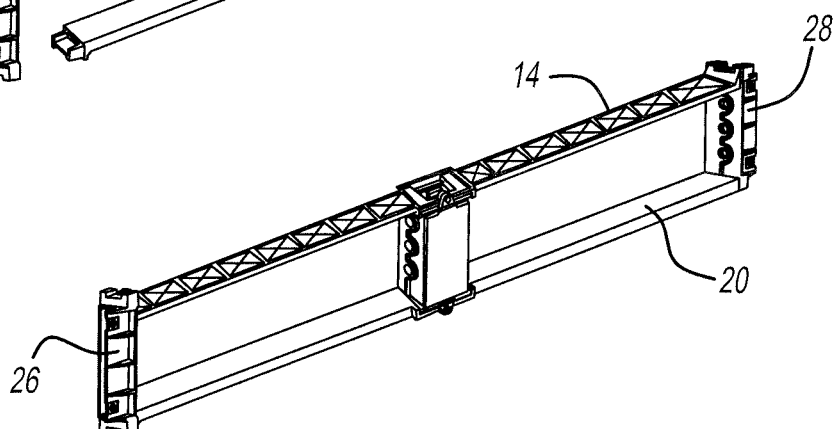
FIG. 8D is a perspective view showing the assembly of the modular frame.

The motor housing 36 is has an upper end 44 that connects to an upper frame center joint 46 of the upper frame portion 14. A lower end 48 of the motor housing 36 connects to a lower frame center joint 50 formed on the lower frame portion 20. The connection between both the upper end 44, upper frame center joint 46, lower end 48 and lower frames center joint 50 can be any type of suitable connection; however, the present invention provides an interlocking dovetail joint 52, which is best shown in FIGS. 8a and 8n. Each interlocking dovetail joint 52 has a protrusion 54 capable of sliding into a groove 56 for aligning and locking the motor housing 36 to its respective upper frame portion 14 or lower frame portion 20. In order to lock the motor housing 36 together with the upper frame portion 14 and lower frame portion 20. Each interlocking dovetail joint 52 also has a tab with a boss and fastener arrangement 58 for locking the interlocking dovetail joint 52 in place. It is within the scope of this invention for some type of locking tab or other molded locking mechanism to be used instead of the tab, boss and fastener arrangement 58.

Figure 1:
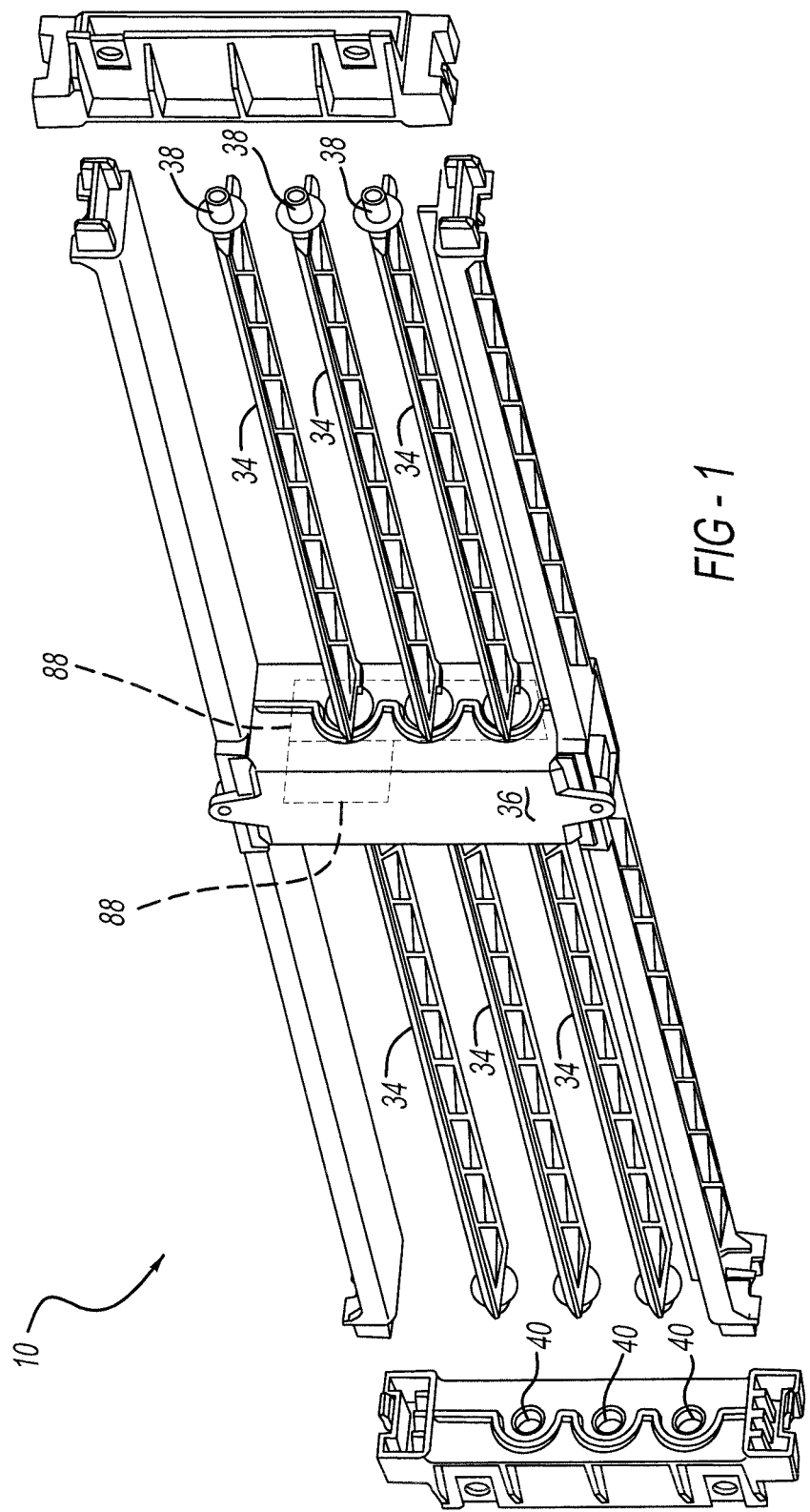
FIG. 1 is an exploded angled perspective view of an active grille shutter arrangement in accordance with the present invention.
Figure 2A:
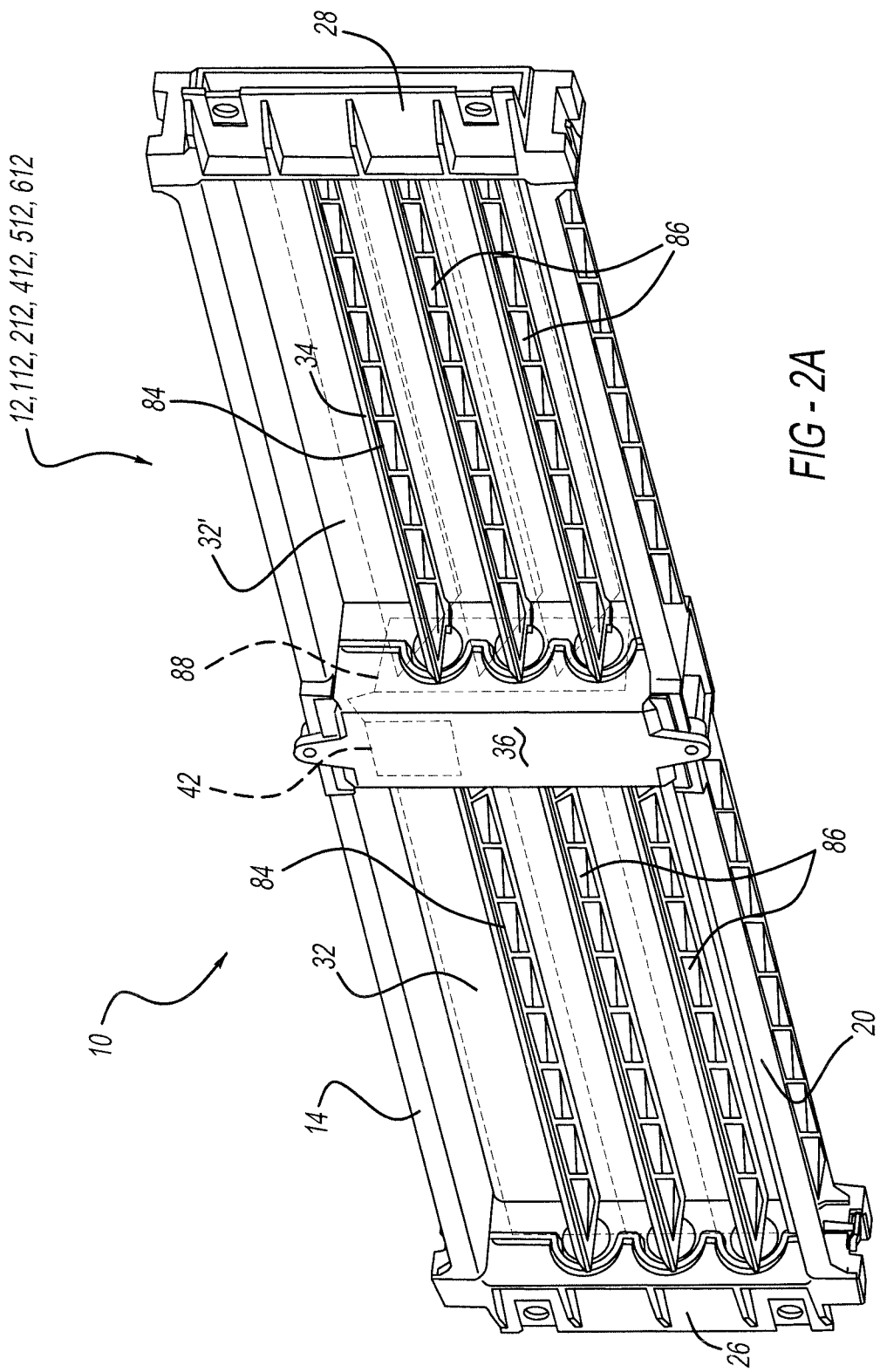
FIG. 2A is an angled perspective view of the active grille arrangement in accordance with the present invention.

Referring to FIGS. 2A, 2B, 2C and 4, another aspect of the invention is shown that includes a modular frame kit 13 (shown in FIG. 4), including parts of varying sizes used to create different modular frames. The modular frame 12 is a first modular frame having a different height and width from a second modular frame 12' or third modular frame 12". The first modular frame 12, second modular frame 12' and third modular frame 12" are created by using the different alternate parts shown in FIGS. 2A, 2B, 2C and 4, which include the upper frame portion 14, that is a first upper frame portion, a second upper frame portion 14', third upper frame portion 14", the second lower frame portion 20 that is a first lower frame portion, a second lower frame portion 20', third lower frame portion 20", vanes 34, that are a first vanes, second vanes 34' and third vanes 34" (shown in FIGS. 2A, 2B and 2C) all of which having different widths. The modular frame kit 13 further includes end caps 26, 28 that are a first set of end caps, a second set of end caps 26', 28' and a third set of end caps 26", 28" each having different heights. Also the modular frame kit 13 includes the motor housing 36, which is a first motor housing, second motor housing 36' and third motor housing 36" each having a different height and can be interchanged with the other parts of the modular frame kit to form the first modular frame 12, second modular frame 12', third modular frame 12" as shown in FIGS. 2A-2C. During assembly one upper frame portion, one lower frame portion, one motor housing and one set of end caps is selected to create a desired modular frame construction. The selected one of the set of end caps is connected to respective opposing ends of the one selected upper frame portion and one selected lower frame portion forming a generally rectangular or square frame. The one selected motor housing is connected between the one selected upper frame portion and the one selected lower frame portion.

It is also within the scope of this invention for the parts of the modular frame kit 13 to be used in other combinations to create other modular frame constructions having a height, width and shape that will vary depending on the different components used. It is further within the scope of this invention for the modular frame kit to have a greater or lesser number of alternate components having different dimensions and is not limited to just three alternative parts.

The modular frame kit 13 provides a great deal of versatility for the various components since the modular frames 12, 12', 12" can have a different size assembled from parts having different lengths. This allows the modular frame 12, 12', 12" to be used with various variants encountered in and incorporating active grille shutter arrangements on vehicles. This also increases the shipping density of the components of the modular frame 12, 12', 12" by allowing similar parts to be packaged together more tightly than would be possible with a modular frame that is one piece.

Figure 5:
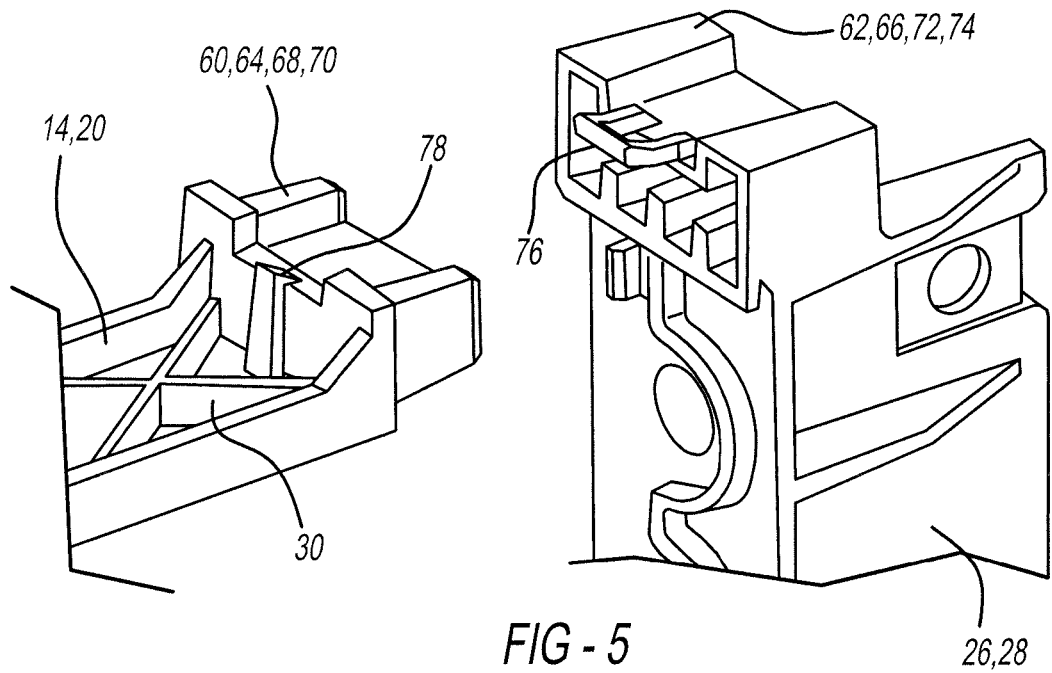
FIG. 5 is an enlarged perspective view of an end joint of the upper frame portion.
Figure 6:
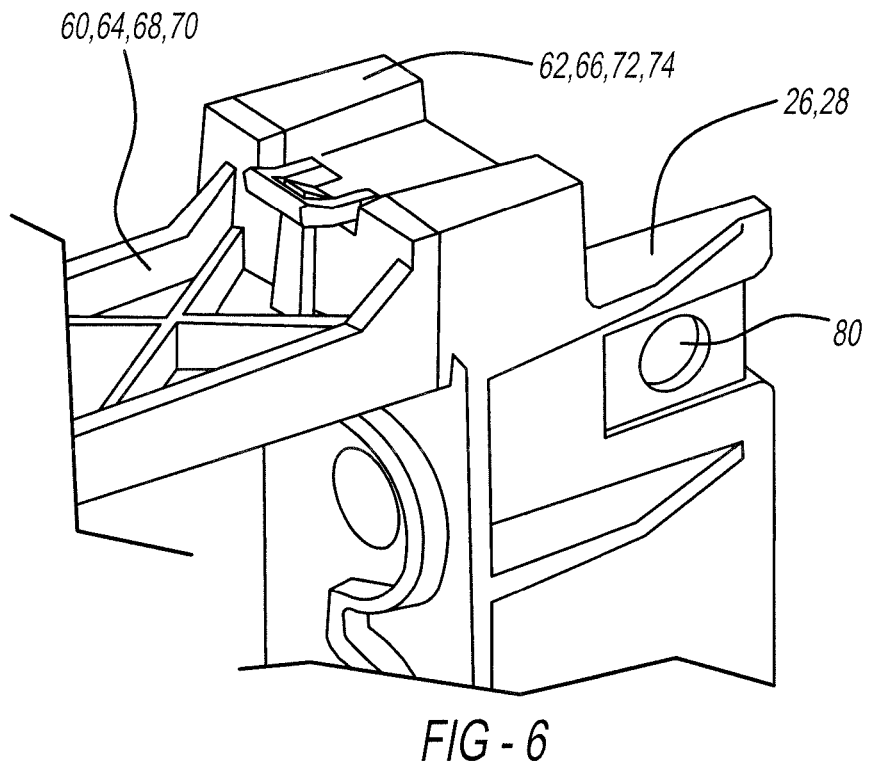
FIG. 6 is an enlarged perspective view of the assembled end joint and end cap joint in accordance with the present invention.
Figure 7A:
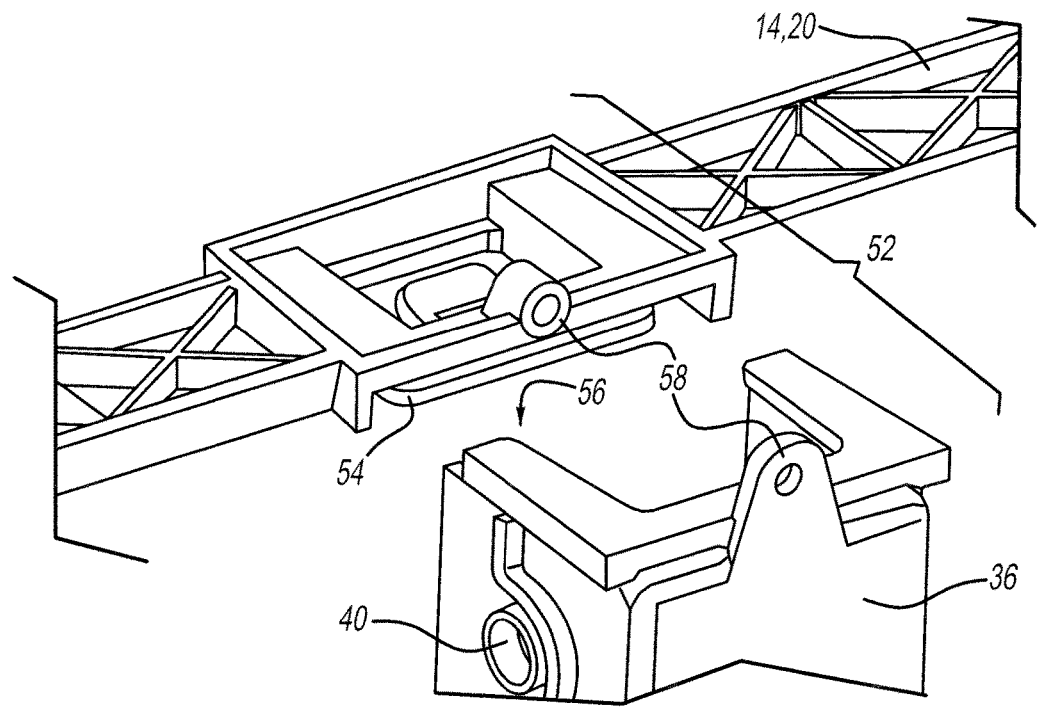
FIG. 7A is an exploded perspective angled view of an interlocking dovetail joint on the upper frame portion with the upper portion of the motor housing exploded from the interlocking dovetail joint.
Figure 7B:
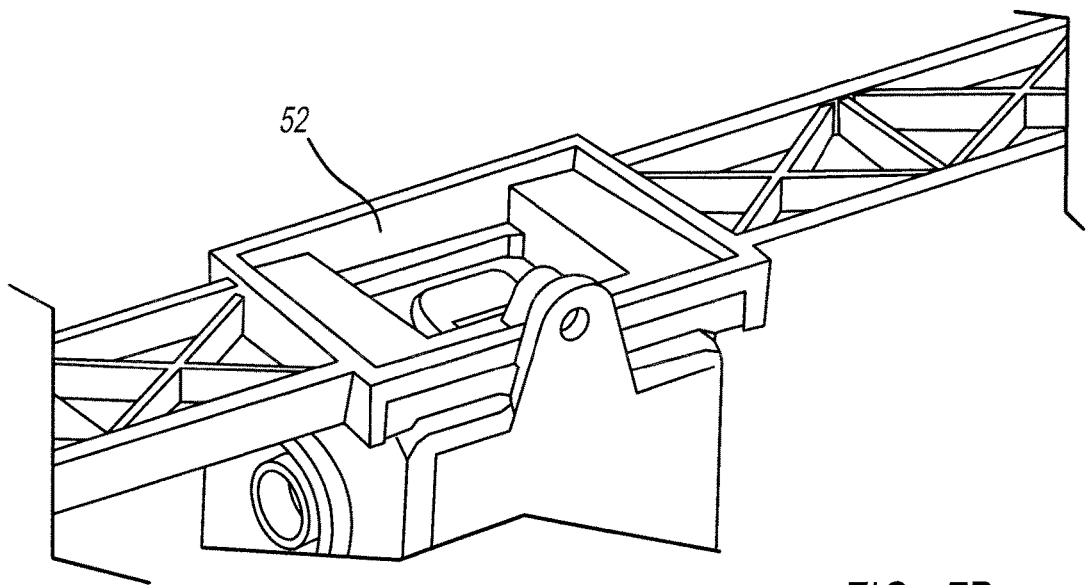
FIG. 7B is an enlarged perspective view of the motor housing assembled to the interlocking dovetail joint of the upper frame portion.

Referring now to FIGS. 5 and 6, the connection between the first and second ends 16, 18 of the upper frame portion and the first and second ends of the lower frame portion 22, 24 with each respective first end cap 26 and second end cap 28 are shown. The first end 16 of the upper frame portion 14 has an upper bar end joint 60 formed thereon which is configured to slide into an upper bar end cap joint 62 formed on the first end cap 26. The first end 22 of the lower frame portion 20 has a lower bar end joint 64 formed thereon which slides into a lower bar end cap joint 66 of the first end cap 26. Similarly, the second end 18 of the upper frame portion 14 has an upper bar end joint 68 formed thereon and the second end 24 of the lower frame portion 20 has a lower bar end joint 70 formed thereon. The upper bar end joint 68 of the second end 18 of the upper frame portion 14 is configured to slide into an upper bar end cap joint 72 of the second end cap 28. Also, the lower bar end joint 70 on the second end 24 of the lower frame portion 20 slides into the lower bar end cap joint 74 of the second end cap 28. Once the upper frame portion 14 and lower frame portion 20 are connected to the first end cap 26 and second end cap 28 as described above, the modular frame 12 is complete.

Referring again to FIGS. 5 and 6, is an exploded exemplary view of the connection between a respective one of the upper bar end joint 60, 68 or lower bar end joint 64, 70 with the respective upper bar end cap joints 62, 72 or lower bar end cap joints 66, 74. The upper bar end joint 60, 68 and lower bar end joint 64, 70 have show a protrusion that is configured to slide into a housing for receiving the protrusion as shown at the upper bar end cap joint 62, 72 and lower bar end cap joint 66, 74. In order to lock all the pieces together, an end cap snap tab 76 is used to lockingly receive a frame bar snap post 78. While the drawings of the present invention show the end cap snap tabs 76 as being formed on the lower bar end cap joint 66, 74 or upper bar end cap joint 62, 72 and the frame bar snap post 78 being formed on the upper bar end joint 60, 68 or lower bar end joint 64, 70, it is within the scope of the invention for the end cap snap tab 76 and frame bar snap post 78 to be reversed and on opposing structures. Additionally, it is possible for other suitable injection molded locking mechanisms to be used including tongue in groove type locks, as well as the use of adhesive or mechanical fasteners depending upon the needs of a particular application.

Referring now to FIGS. 1 and 3-8D, once the active grille shutter arrangement 10 has been fully assembled, the arrangement can be connected to a vehicle using body mounts 80 which are holes used for connecting the modular frame 12 using fasteners. However, it is possible for other types of connection mechanisms to be used such as adhesives, welding or other needs depending on a particular application. It is also within the scope of this invention for the active grille shutter arrangement 10 to be connected to the vehicle chassis, front end module or the fascia of the vehicle.

Referring now to FIG. 2A, an assembled active grille shutter arrangement 10 is shown having the having the specific valves 34 are shown. The plurality of vanes 34 include a driving vane 84 connected to the motor and the other of the plurality of vanes are driven vanes 86 that are driven by a link bar 88 connected to the driving vane 84. FIG. 2A shows two driving vanes 84, located on opposite sides of the motor housing 36 which allows for the two apertures of the modular frame to be opened and closed independently of each other depending on the type of motor used.

Figure 9:
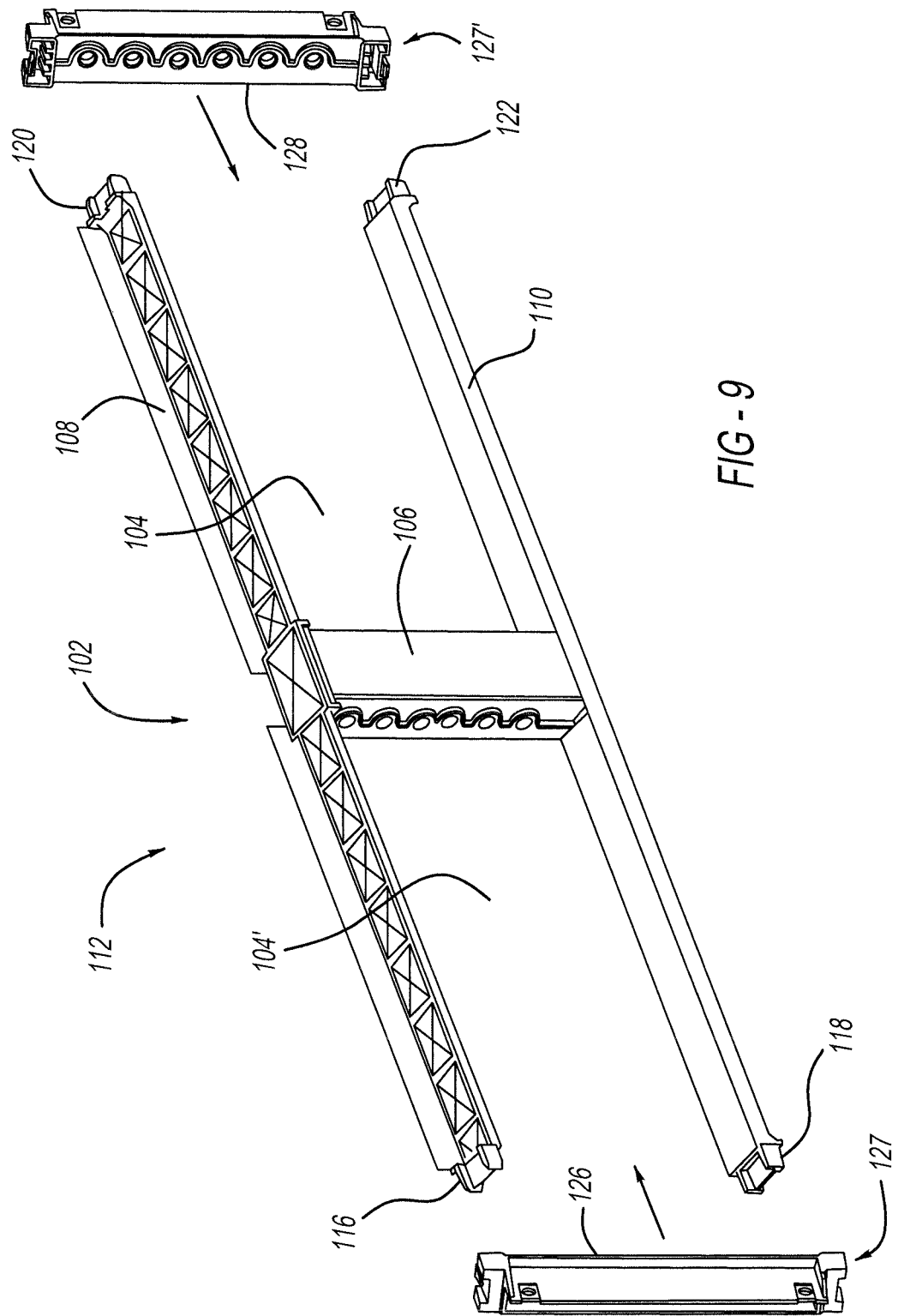
FIG. 9 is an exploded perspective view of a third embodiment of the invention.

Referring now to FIGS. 9-14 several alternate embodiments of the modular frame of the active grille shutter system 10 are shown and described. In each of these various embodiments the modular frame has a different shape, and in other embodiments has differently shaped primary frame pieces and secondary frame pieces, which are assembled together to form the modular frame of the active grille shutter arrangement. In particular FIG. 9 shows an alternate embodiment of a modular frame 112 having a primary frame piece 102 that is a one piece having the shape of a capital letter "I" or capital letter "H". The primary frame piece 102 defines a width and height of an aperture 104 of the modular frame 112. The primary frame piece 102 in the present embodiment of the invention is a single piece and further includes a motor housing 106, upper frame portion 108 and lower frame portion 110. The motor housing 106 extends between the upper frame portion 108 and the lower frame portion 110 and divides the aperture 104 in half. The modular frame 112 further includes a plurality of secondary frame pieces 127, 127 that include a first end cap 126 and second end cap 128. The first end cap 126 and second end cap 128 are connectable to both the upper frame portion 108 and lower frame portion 110. The first end cap 126 connects to a first end 116 of the upper frame portion 108 and a first end 118 of the lower frame portion 110. The second end cap 128 connects to a second end 120 of the upper frame portion 108 and a second end 122 of the lower frame portion 110. The manner in which the connection between the first end cap 112 and second end cap 114 with the primary frame piece is shown and described above with respect to FIGS. 5 and 6. The present embodiment of the invention allows for the modular frame 112 to be formed from a fewer number of pieces than the embodiments shown and described in FIG. 4.

Figure 11:
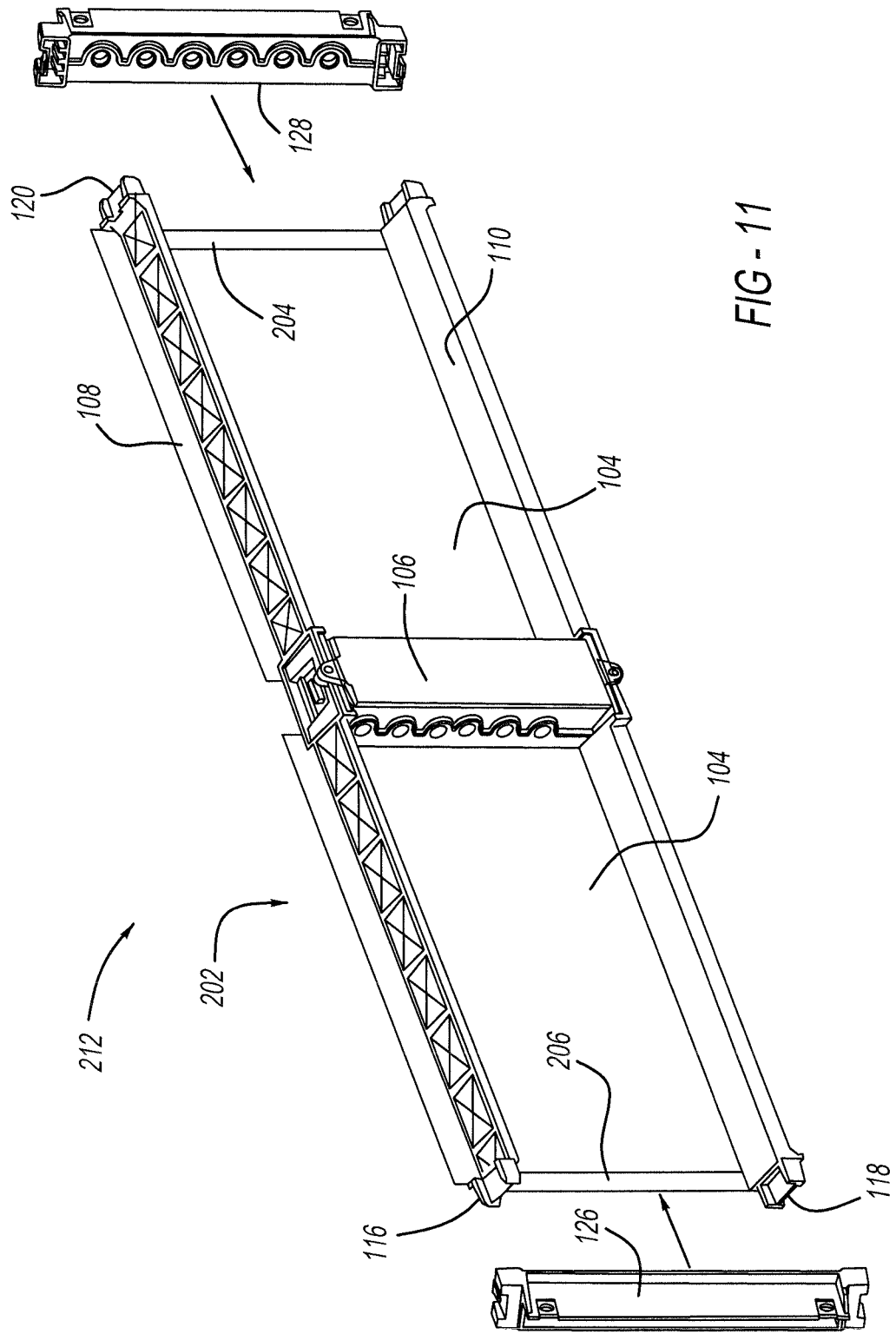
FIG. 11 is an exploded perspective view of a fifth embodiment of the invention.

Referring now to FIG. 11 an alternate embodiment of a modular frame 212 is shown. The elements of a modular frame 112 are similar or identical to those shown and described with respect to FIG. 9 above, therefore similar elements have been labeled using the same reference numerals. In the present embodiment of the invention a primary frame piece 202 includes bridge elements 204, 206 that are formed as part of the primary frame piece 202 or snapped onto the primary frame piece 202 in order to stabilize and prevent warping of the primary frame piece 202. The stabilization and warping can occur during the formation of the primary frame piece 202, which is typically formed from molten polymer, or the warpage can result during transport, prior to assembly of the modular frame 200. The first end cap 112 and second end cap 114 are connected to the primary frame piece 202 in the same manner as described above. The bridge elements 204, 206 are formed onto the primary frame piece 202 during molding or they may be connected to the primary frame piece 202 after formation. The bridge elements can either stay in place upon connection of the secondary frame pieces, such as the first end cap 126 or second end cap 128 or they can be removed after connection of the first end cap 126 or second end cap 128.

Figure 10:
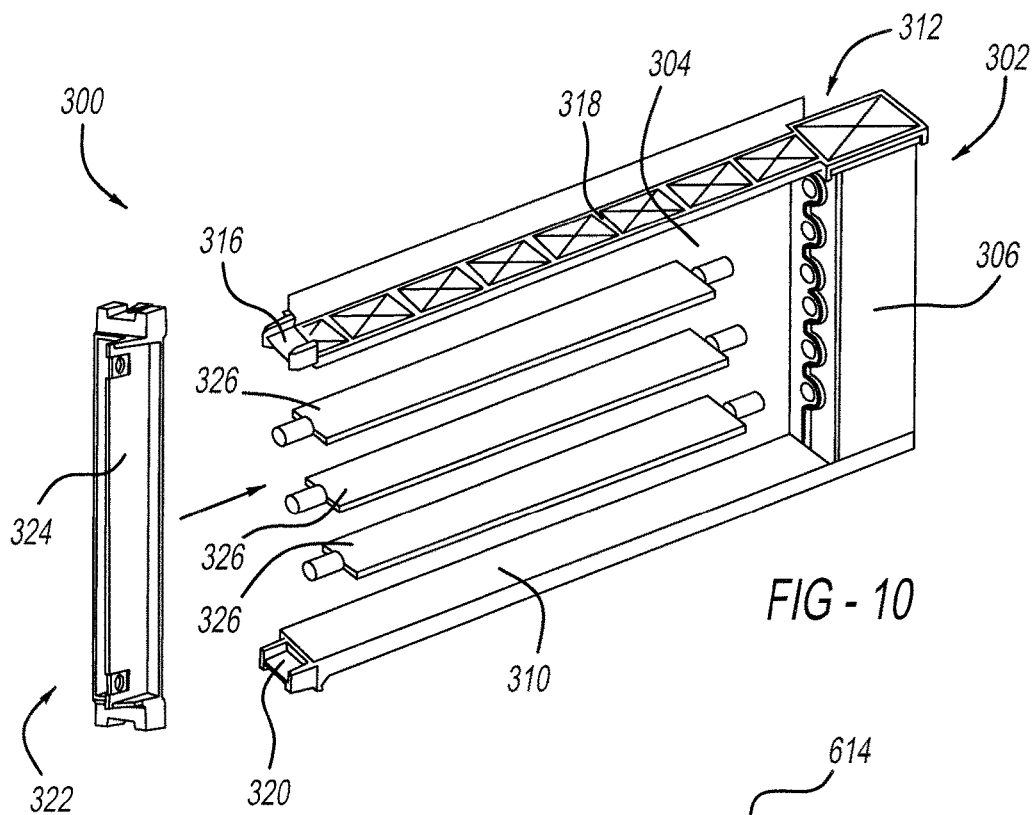
FIG. 10 is an exploded perspective view of a fourth embodiment of the invention.

Referring now to FIG. 10 another alternate embodiment of a modular frame 312 is shown for an active grille shutter arrangement 300. In this embodiment of the invention there is a primary frame piece 302 with three sides including an upper frame portion 318, lower frame portion 310 and a motor housing 306 that houses the motor for driving a plurality of vanes 326 in a manner similar to the embodiments described above. The motor housing 306 extends between the upper frame portion 318 and the lower frame portion 310. The upper frame portion has an end 316 and the lower frame portion has an end 320 that a secondary frame piece 322, that is an end cap 324 similar to the first end cap and second end cap in the previous embodiments connects to form an aperture 304. In this embodiment of the invention the motor housing does not extend across the aperture 304 of the modular frame 312. Vanes 326 extend across the aperture 304 and rotatably connect to the motor housing 306 and the secondary frame 322. The modular frame 312 in the present embodiment of the invention is used in active grille shutter arrangements where it is desirable to not divide the aperture 304 in half using a motor housing. Also the vanes 326 are controlled by a motor and link bar which are shown and described in FIG. 2 above.

Figure 12:
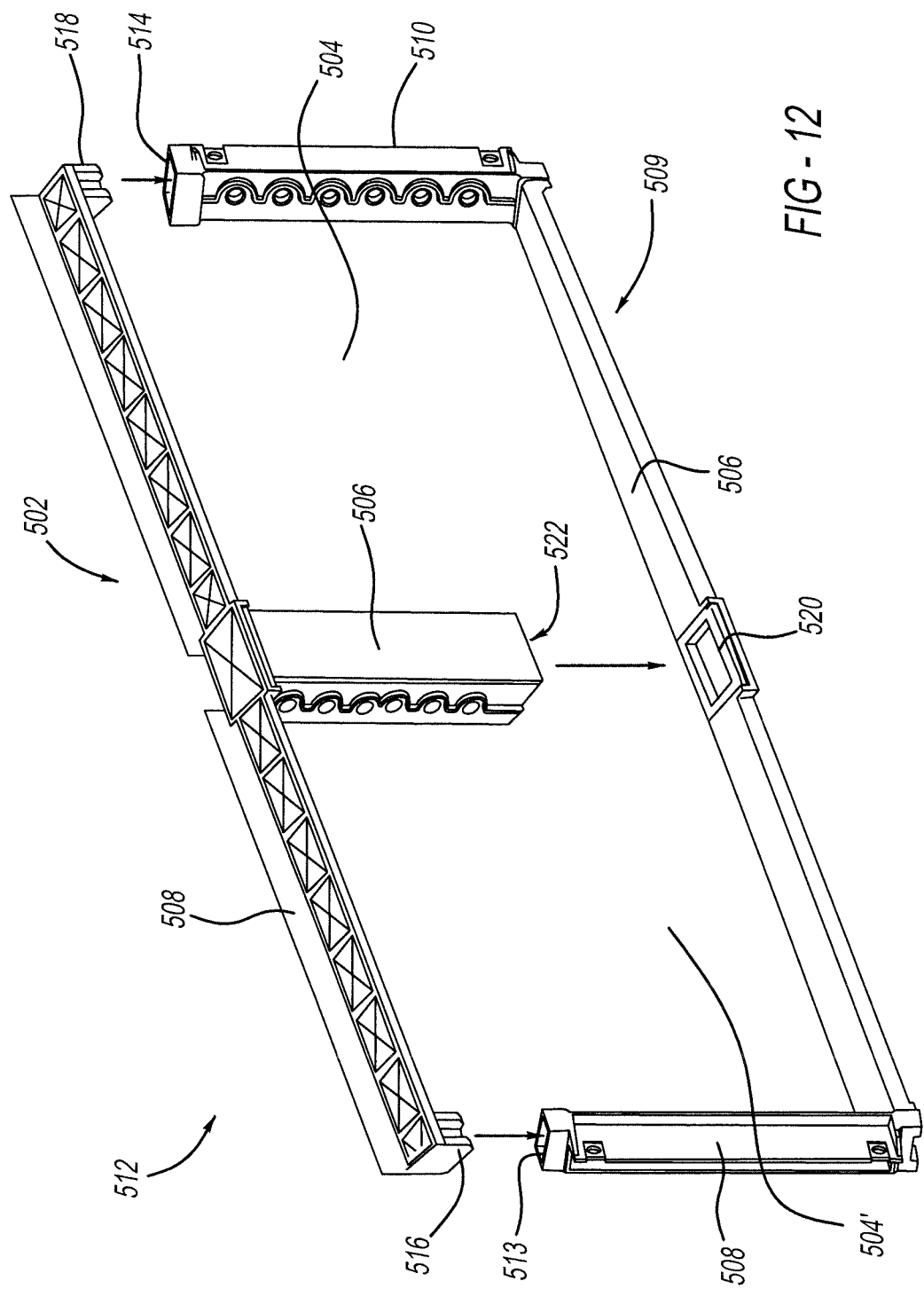
FIG. 12 is an exploded perspective view of a sixth embodiment of the invention.

Referring now to FIG. 12 an alternate embodiment of a modular frame 512 having a primary frame piece 502 that is one piece having the shape of a capital letter "T". The primary frame piece 502 defines a width and height of an aperture 504, 504' of the modular frame 512. The primary frame piece 502 in the present embodiment of the invention is a single piece and further includes a motor housing 506 and upper frame portion 508. There is a secondary frame piece 509 having the shape of a capital letter "U" and is a single piece having a lower frame portion 506 and upwardly extending first end portion 508 and second end portion 510. The first end portion 508 and second end portion 510 each have a receiving end joint 513, 514 that face upward toward the primary frame piece 502. The upper frame portion 508 has downwardly facing post 516, 518 that are received by a respective receiving end joint 513, 514. The motor housing 506 has a lower motor housing connection member 522 and connection point 520 formed on the lower frame portion 506 that connects the motor housing 506 to the secondary frame piece 509. The motor housing 506 extends between the upper frame portion 508 and lower frame portion 506 and defines the aperture 504,504'. The connection between each downwardly facing post 516, 518 and the receiving end joint 513, 514 and the lower motor housing connection member 522 and connection point 520 are not limited to any particular configuration but can be the types of connections shown and described in FIGS. 5, 6 and 7. The modular frame 512 in the present invention can be assembled by vertically snapping the primary frame piece 502 and the secondary frame piece 509 together.

Figure 13:
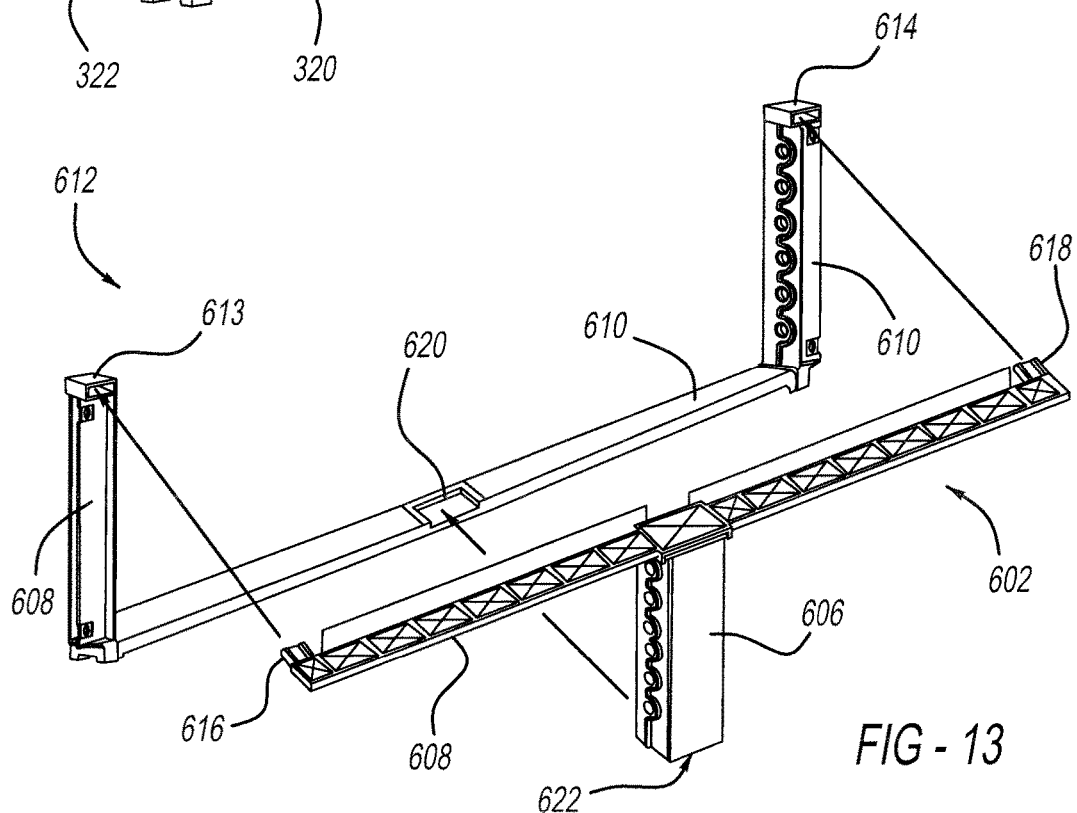
FIG. 13 is an exploded perspective view of a seventh embodiment of the invention including an alternate method of assembly.

FIG. 13 depicts an additional alternate embodiment of the modular frame 512 shown in FIG. 12. In this embodiment a modular frame 612 a primary frame piece 602 that is a one piece having the shape of a capital letter "T". The primary frame piece 602 defines a width and height of an aperture 604 of the modular frame 612. The primary frame piece 602 in the present embodiment of the invention is a single piece and further includes a motor housing 606 and upper frame portion 608. There is a secondary frame piece 609 having the shape of a capital letter "U" and is a single piece having a lower frame portion 606 and upwardly extending first end portion 608 and second end portion 610. The first end portion 608 and second end portion 610 each have a receiving end joint 613, 614 that face perpendicular to the plane of the aperture 604 formed in the modular frame 612. The upper frame portion 608 has a post 616, 618 that also face in a direction perpendicular to the aperture 604 and are received by a respective receiving end joint 613, 614. The motor housing 606 has a lower motor housing connection member 622 and connection point 620 formed on the lower frame portion 606 that connects the motor housing 606 to the secondary frame piece 609. The motor housing 606 extends between the upper frame portion 608 and lower frame portion 606 and divides the aperture 604 in half. The connection between each post 616, 618 and the receiving end joint 513, 514 and the lower motor housing connection member 622 and connection point 620 are not limited to any particular configuration but can be the types of connections shown and described in FIGS. 5, 6 and 7. The modular frame 612 in the present invention is assembled by horizontally snapping the primary frame piece 602 and the secondary frame piece 609 together by moving the piece perpendicular to the plane of the aperture 504 formed by the modular frame 512.

Figure 14:
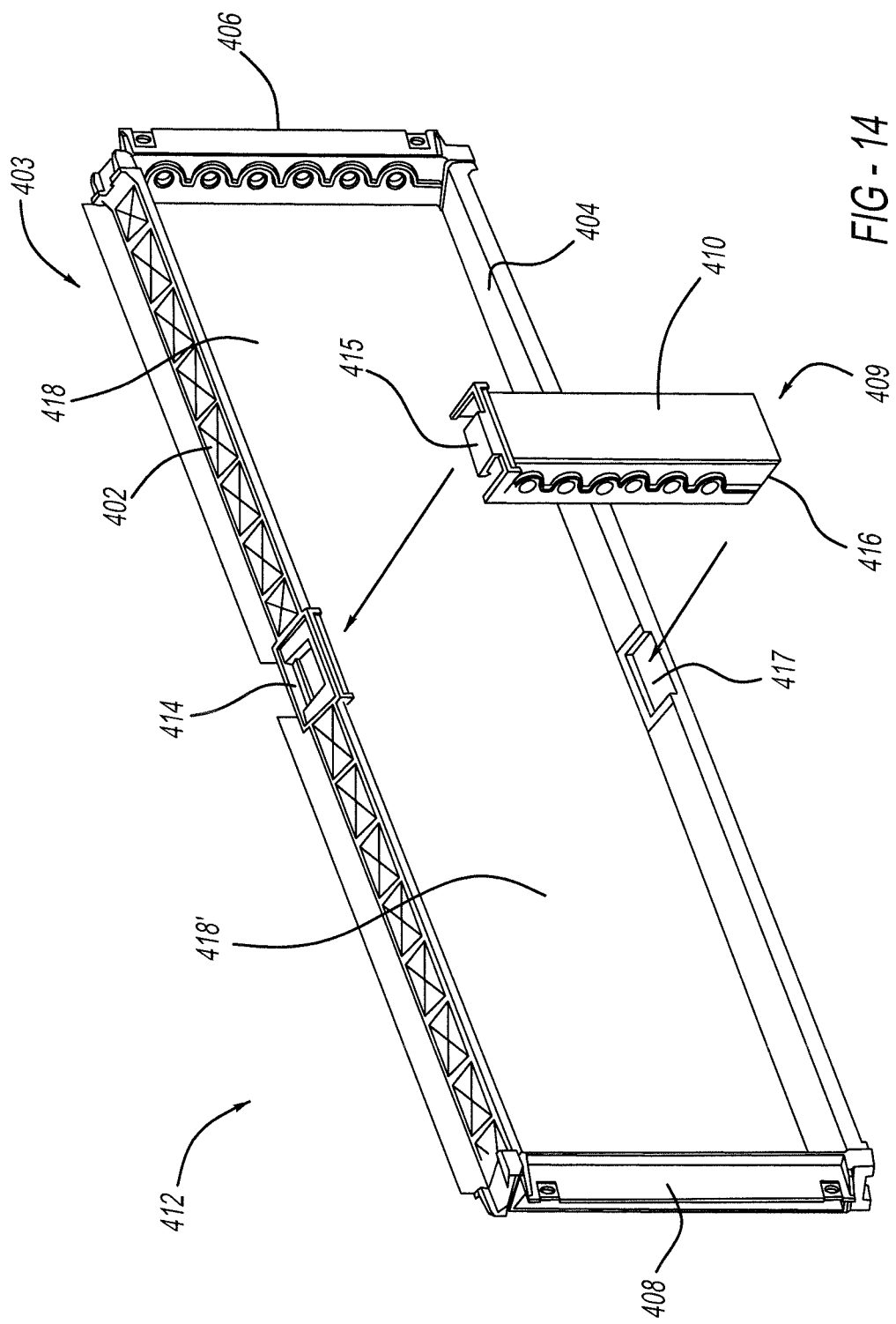
FIG. 14 is an exploded perspective view of an eighth embodiment of the invention.

Referring to FIG. 14 an alternate embodiment of a modular frame 412 is shown. The modular frame 412 has a primary frame piece 403 that is a single piece having a generally rectangular shape that defines an aperture 418, 418'. While a rectangular shape is shown, it is within the scope of this invention for the modular frame 412 to have a different shape, such as but not limited to a square, circle, trapezoid or virtually any other type of shape. The primary frame piece 403 has an upper frame portion 402, lower frame portion 404. There is a first end portion 408 extending between the upper frame portion 402 and lower frame portion 404 at one end and a second end portion 406 extending between the upper frame portion 402 and lower frame portion 404 at a second end. A secondary frame piece 409, which is a motor housing 410 used to house an actuator for the active grille shutter system connects to the upper frame portion 402 and at the lower frame portion 404. The motor housing 410 has a lower motor housing connection member 416 that connects to a connection point 417 formed on the lower frame portion 404 and an upper motor housing connection member 415 that connects to a connection point 414 formed on the upper frame portion 402. The connections for the motor housing 410 can take any form but include all of the types of connections shown and described in FIG. 7.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An active grille shutter arrangement having an modular frame comprising:
   a primary frame piece defining a width and height of an aperture of the modular frame;
   at least one secondary frame piece connectable to the primary frame piece, wherein the primary frame piece and the at least one secondary frame piece form the modular frame having at least one aperture capable of allowing air to pass through the modular frame;

at least one connection joint between the primary frame piece and the at least one secondary frame, wherein the at least one connection joint each include an interlocking dovetail joint secured with a tab and boss; and a plurality of vanes rotatably positioned between the at least one primary frame piece and the at least one secondary frame.

2. The active grille shutter arrangement of claim 1 further comprising:

a motor housing forming part of the primary frame piece or the at least one secondary frame piece; and a motor connected to the motor housing, wherein the motor is connected to the plurality of vanes to cause the plurality of vanes to rotate between an open position, closed position and one or more intermediate positions relative to the aperture of the modular frame.

3. The active grille shutter arrangement of claim 2, wherein the motor housing extends across the aperture of the modular frame, dividing the aperture into two sections.

4. The active grille shutter arrangement of claim 2, wherein the motor housing does not extend across the aperture of the modular frame.

5. The active grille shutter arrangement of claim 1 further comprising:

one of the plurality of vanes is a driving vane connected to a motor and all of the other plurality of vanes are connected to the driving vane by a linkage mechanism for rotating all the plurality of vanes in response to the motor rotating the driving vane.

6. The active grille shutter arrangement of claim 1 further comprising:

wherein each one of the plurality of vanes has two ends with barrels formed on each of the two and ends; and holes formed on the primary frame piece and the at least one secondary frame piece to rotatably receive one of said barrels of one of said plurality of vanes.

7. The active grille shutter arrangement of claim 1 further comprising:

one or more bridges on the primary frame piece for stabilizing the primary frame piece frame portion prior to connection of the at least one secondary frame piece.

8. An active grille shutter arrangement having an modular frame comprising:

a primary frame piece defining a width and height of an aperture of the modular frame:

at least one secondary frame piece connectable to the primary frame piece, wherein the primary frame piece and the at least one secondary frame piece form the modular frame having at least one aperture capable of allowing air to pass through the modular frame; and a plurality of vanes rotatably positioned between the at least one primary frame piece and the at least one secondary frame;

at least one connection joint between the primary frame piece and the at least one secondary frame piece;

an end cap snap tab and snap post connection located at each of the least one connection joint between the primary frame piece and the at least secondary frame piece.

9. The active grille shutter arrangement of claim 8 further comprising:

a motor housing forming part of the primary frame piece or the at least one secondary frame piece; and a motor connected to the motor housing, wherein the motor is connected to the plurality of vanes to cause the plurality of vanes to rotate between an open position, closed position and one or more intermediate positions relative to the aperture of the modular frame.

10. The active grille shutter arrangement of claim 9, wherein the motor housing extends across the aperture of the modular frame, dividing the aperture into two sections.

11. The active grille shutter arrangement of claim 9, wherein the motor housing does not extend across the aperture of the modular frame.

12. The active grille shutter arrangement of claim 8 further comprising one of the plurality of vanes is a driving vane connected to a motor and all of the other plurality of vanes are connected to the driving vane by a linkage mechanism for rotating all the plurality of vanes in response to the motor rotating the driving vane.

13. The active grille shutter arrangement of claim 8 further comprising:

wherein each one of the plurality of vanes has two ends with barrels formed on each of the two and ends; and holes formed on the primary frame piece and the at least one secondary frame piece to rotatably receive one of said barrels of one of said plurality of vanes.

14. The active grille shutter arrangement of claim 8 further comprising:

one or more bridges on the primary frame piece for stabilizing the primary frame piece frame portion prior to connection of the at least one secondary frame piece.

15. An active grille shutter arrangement having an modular frame comprising:

a primary frame piece defining a width and height of one or more apertures of the modular frame, wherein the primary frame piece has an upper frame portion having a first end and a second end, a lower frame portion having a first end and a second end and a motor housing extending between the upper frame portion and the lower frame portion;

a plurality of secondary frame pieces including a first end cap, connectable to the respective first end of the upper frame portion and first end of the lower frame portion by an upper bar end joint formed on the first end of the upper frame portion and a lower bar end joint formed on the first end of the lower frame portion, and a second end cap of the plurality of secondary frame pieces connectable to both the second end of the upper frame portion and the second end of the lower frame portion by an upper bar end joint formed on the second end of the upper frame portion and a lower bar end joint formed on the second end of the lower frame portion;

the modular frame of the active griller shutter arrangement formed by the connection of the primary frame piece and the secondary frame piece, wherein the modular frame defines the one or more apertures;

a plurality of vanes rotatably positioned between the first end cap and the second end cap for controlling the amount of air flowing through the one or more apertures formed by the modular frame; and wherein the motor housing of the primary frame piece extends between the upper frame portion and the lower frame portion.

16. The active grille shutter arrangement of claim 15 further comprising:

a motor connected to the motor housing, wherein the motor is connected to the plurality of vanes to cause the plurality of vanes to rotate between an open position, closed position and one or more intermediate positions relative to the aperture of the modular frame.

17. The active grille shutter arrangement of claim 16, wherein the motor housing extends across the aperture of the modular frame, dividing the aperture into two sections.

18. The active grille shutter arrangement of claim 16, wherein the motor housing does not extend across the aperture of the modular frame, dividing the aperture into two sections.

19. The active grille shutter arrangement of claim 15 further comprising:
one of the plurality of vanes is a driving vane connected to the motor and all of the other plurality of vanes are connected to the driving vane by a linkage mechanism for rotating all the plurality of vanes in response to the motor rotating the driving vane.

20. The active grille shutter arrangement of claim 15 wherein the upper bar end joint formed on the first end of the upper frame portion, the lower bar end joint formed on the first end of the lower frame portion, the upper bar end joint formed on the second end of the upper frame portion and the lower bar end joint formed on the second end of the lower frame portion each include an interlocking dovetail joint secured with a tab and boss.

21. The active grille shutter arrangement of claim 15 wherein the upper bar end joint formed on the first end of the upper frame portion, the lower bar end joint formed on the first end of the lower frame portion, the upper bar end joint formed on the second end of the upper frame portion and the lower bar end joint formed on the second end of the lower frame portion each include an end cap snap tab and snap post connection located at each of the least one connection point between the primary frame and the secondary frame.

22. The active grille shutter arrangement of claim 15 further comprising:
wherein each one of the plurality of vanes has two ends with barrels formed on each of the two and ends; and
holes formed on the primary frame piece and secondary frame to rotatably receive one of said barrels of one of said plurality of vanes.

23. The active grille shutter arrangement of claim 15, wherein the motor housing has an upper end connected to an upper frame center joint formed on the upper frame portion between the first end and the second end of the upper frame portion and a lower end of the motor housing connected to the lower frame portion at a lower frame center joint formed on the lower frame portion between the first end and the second end of the lower frame portion.

24. The active grille shutter arrangement of claim 23 wherein the connection between the motor housing at the lower frame center joint and the upper frame center joint are each an interlocking dovetail joint secured with a tab and boss connected together with a fastener when the tab and boss are aligned.

25. The active grille shutter arrangement of claim 15 further comprising a lower end of the motor housing connected to the lower frame portion at a lower frame center joint formed on the lower frame portion between the first end and the second end of the lower frame portion.

26. The active grille shutter arrangement of claim 25 wherein the connection between the motor housing at the lower frame center joint is an interlocking dovetail joint secured with a tab and boss connected together with a fastener when the tab and boss are aligned.

27. The active grille shutter arrangement of claim 15 further comprising one or more bridges extending between the upper frame portion and the lower frame portion for stabilizing the upper frame portion and lower frame portion prior to connection of the plurality of secondary frame pieces.

28. A modular frame kit including interchangeable parts of varying sizes used to create different modular frames comprising:
one of a first modular frame, second modular frame and third modular frame each having a different height and width formed from the modular frame kit comprising:
one selected upper frame portion selected from a group comprising a first upper frame portion, a second upper frame and a third upper frame portion each having different widths;
one selected lower frame portion selected from a group comprising a first lower frame portion, a second lower frame and a third lower frame portion each having different widths;
one selected motor housing selected from a group comprising a first motor, second motor housing and third motor housing each having different heights;
one selected set of end caps selected from a group comprising a first set of two end caps, second set of two end caps and third set of two end caps each having different heights; and
wherein each one of the one selected set of end caps is connected to respective opposing ends of the one selected upper frame portion and one selected lower frame portion forming a rectangular frame, and the one selected motor housing connected between the one selected upper frame portion and the one selected lower frame portion.

* * * * *